United States Patent
Császár

(10) Patent No.: US 9,197,547 B2
(45) Date of Patent: *Nov. 24, 2015

(54) INCREASING FAILURE COVERAGE OF MOFRR WITH DATAPLANE NOTIFICATIONS

(71) Applicant: Telefonaktiebolaget L M Ericsson (publ), Stockholm (SE)

(72) Inventor: András Császár, Telki (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,327

(22) Filed: Jul. 16, 2014

(65) Prior Publication Data
US 2014/0355422 A1    Dec. 4, 2014

Related U.S. Application Data

(63) Continuation of application No. 13/486,470, filed on Jun. 1, 2012, now Pat. No. 8,824,276.

(51) Int. Cl.
*H04L 12/26* (2006.01)
*H04L 12/703* (2013.01)
(Continued)

(52) U.S. Cl.
CPC .............. *H04L 45/28* (2013.01); *H04L 12/189* (2013.01); *H04L 45/22* (2013.01)

(58) Field of Classification Search
CPC ................................ H04L 45/22; H04L 45/28
USPC .................................. 370/218, 216, 239, 242
See application file for complete search history.

(56) References Cited

U.S. PATENT DOCUMENTS

| 7,660,235 B2 | 2/2010 | Alicherry et al. |
| 8,102,848 B1 | 1/2012 | Rao |

(Continued)

FOREIGN PATENT DOCUMENTS

| EP | 2592793 | 5/2013 |
| WO | WO-2005018175 | 2/2005 |
| WO | WO-2012003743 | 1/2012 |

OTHER PUBLICATIONS

Non-Final Office Action, U.S. Appl. No. 13/486,470, dated Dec. 3, 2013, 15 pages.

(Continued)

*Primary Examiner* — Sai-Ming Chan
(74) *Attorney, Agent, or Firm* — Nicholson de Vos Webster & Elliot, LLP

(57) ABSTRACT

An enhanced fast re-route mechanism provides increased failure coverage to a multicast communication network. If a network node detects a failure and determines that it cannot re-route multicast data, the network node sends a downstream fast notification packet (DFNP) in the network. The DFNP causes a downstream merge node to switch reception of the multicast data to its secondary path. The network node then receives an upstream fast notification packet (UFNP) from the merge node. The network node modifies its forwarding information upon receipt of the UFNP such that the multicast data is to be received by the network node from its downstream via which the UFNP was received. The DFNP and the UFNP cause the multicast data to reverse its flow direction between the network node and the merge node.

20 Claims, 7 Drawing Sheets

(51) Int. Cl.
*H04L 12/707* (2013.01)
*H04L 12/18* (2006.01)

(56) References Cited

U.S. PATENT DOCUMENTS

| | | | |
|---|---|---|---|
| 8,510,551 | B1 | 8/2013 | Desai et al. |
| 8,638,659 | B2 | 1/2014 | Csaszar et al. |
| 8,913,482 | B2 | 12/2014 | Csaszar et al. |
| 2002/0186652 | A1 | 12/2002 | Popovich |
| 2005/0111351 | A1 | 5/2005 | Shen |
| 2006/0159009 | A1 | 7/2006 | Kim et al. |
| 2007/0237072 | A1 | 10/2007 | Scholl |
| 2007/0237085 | A1* | 10/2007 | Tirumalai et al. ............ 370/242 |
| 2007/0253416 | A1 | 11/2007 | Raj |
| 2008/0031130 | A1 | 2/2008 | Raj et al. |
| 2008/0056123 | A1 | 3/2008 | Howard et al. |
| 2008/0107017 | A1 | 5/2008 | Yuan et al. |
| 2009/0201803 | A1 | 8/2009 | Filsfils et al. |
| 2009/0252033 | A1 | 10/2009 | Ramakrishnan et al. |
| 2009/0303996 | A1 | 12/2009 | Takase et al. |
| 2010/0014528 | A1 | 1/2010 | Amir et al. |
| 2011/0019534 | A1 | 1/2011 | Ramakrishnan et al. |
| 2011/0110224 | A1 | 5/2011 | Nakash |
| 2011/0158082 | A1 | 6/2011 | Barkai et al. |
| 2012/0020207 | A1 | 1/2012 | Corti et al. |
| 2012/0033672 | A1 | 2/2012 | Page et al. |
| 2012/0039164 | A1 | 2/2012 | Enyedi et al. |
| 2015/0071055 | A1 | 3/2015 | Csaszar et al. |

OTHER PUBLICATIONS

Non-Final Office Action, U.S. Appl. No. 13/486,651, dated Jan. 14, 2014, 28 pages.
Notice of Allowance, U.S. Appl. No. 13/486,470, dated Apr. 17, 2014, 9 pages.
Final Office Action, U.S. Appl. No. 13/486,651, dated Jun. 4, 2014, 26 pages.
Notice of Allowance, U.S. Appl. No. 13/486 472 dated Sep. 18, 2013 10 pages.
Atlas, A. , et al., "An Architecture for IP/LDP Fast-Reroute Using Maximally Redundant Trees", draft-atlas-rtgwg-mrt-frr-architecture-01, Oct. 31, 2011 26 pages, Routing Area Working Group.
Fei, Aiguo , et al., "A "Dual-Tree" Scheme for Fault-Tolerant Multicast", 2001, 5 pages, IEEE.
Fenner, B. , et al., "Protocol Independent Multicast-Sparse Mode (PIM-SM): Protocol Specification (Revised)", IETF,, RFC4601, Aug. 2006, 112 pages.
Karan, A. , et al., "Multicast only Fast Re-Route draft-karan-mofrr-02", http://www.iett.org/id/draft-karan-mofrr-02.txt, Mar. 9, 2012, 15 pages.
Rescorla, E. "TLS Elliptic Curve Cipher Suites with SHA-256/384 and AES Galois Counter MOe (CGM)", Network Working Group, Aug. 2008, 6 pages.
Shand, M. , et al., "IP Fast Reroute Framework", Internet Engineering Task Force (IETF), Jan. 2010, 15 pages.
Wijnands, IJ. , et al., "Tree Notification to Improve Multicast Fast Reroute, draft-wijnands-rtgw-mcast-frr-tn-00", Oct. 15, 2012, 17 pages, Routing Working Group, Internet-Draft, IETF Trust and the persons identified as the document authors.
Notice of Allowance, U.S. Appl. No. 13/486,651, dated Aug. 14, 2014 8 pages.
Non-Final Office Action, U.S. Appl. No. 14/543,528, dated Jun. 30, 2015, 27 pages.

* cited by examiner

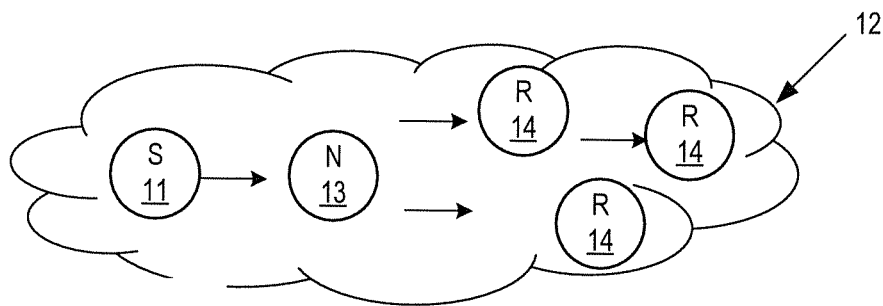
FIG. 1A
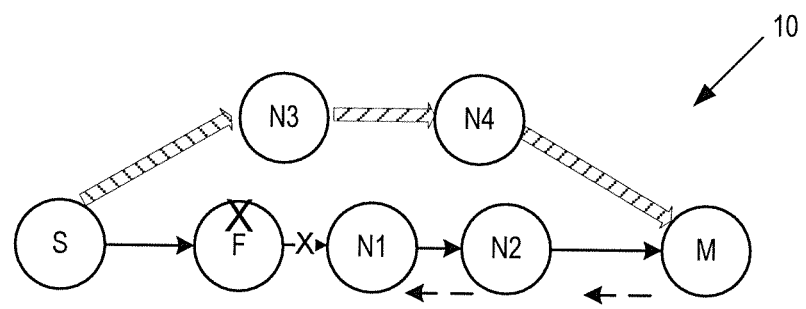
FIG. 1B
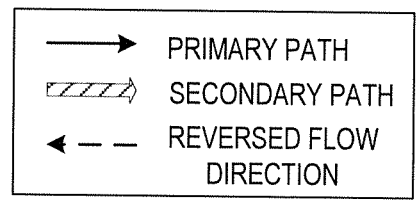

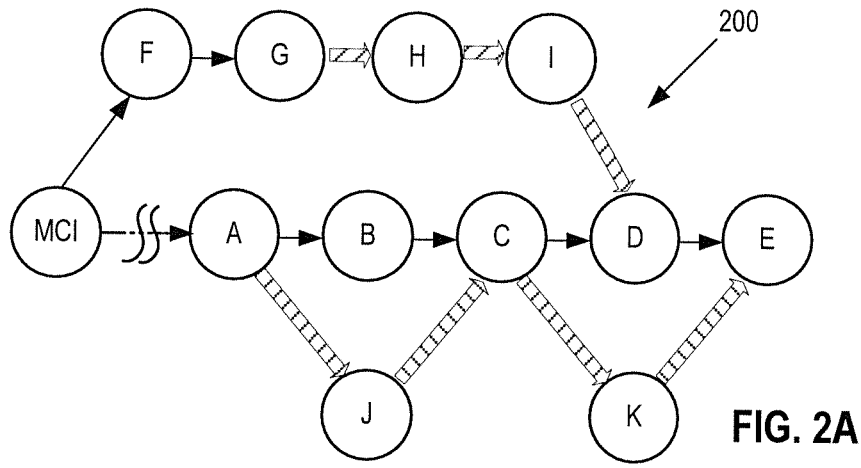
FIG. 2A
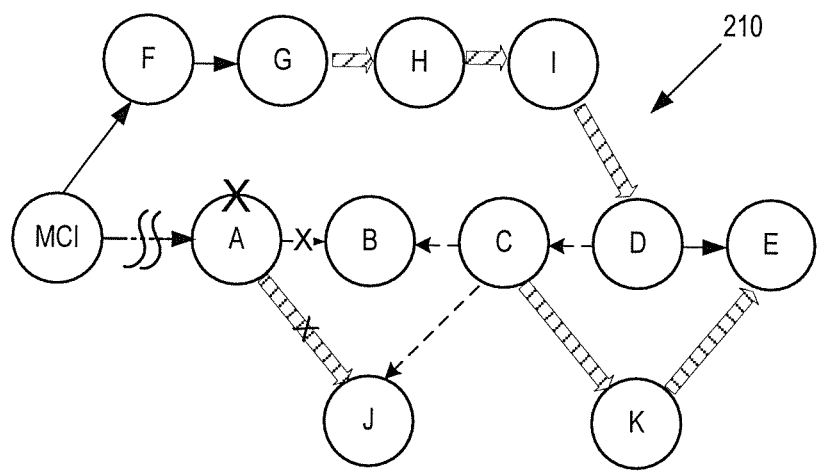
FIG. 2B
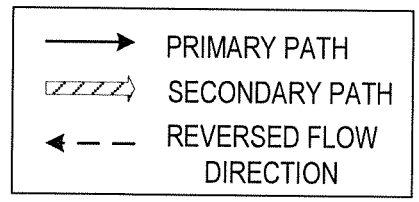

INCREASING FAILURE COVERAGE OF MOFRR WITH DATAPLANE NOTIFICATIONS

CROSS-REFERENCES TO RELATED APPLICATIONS

This application is a continuation of application Ser. No. 13/486,470, which was filed Jun. 1, 2012, which was related to an application entitled "ENHANCEMENTS TO PIM FAST RE-ROUTE WITH DOWNSTREAM NOTIFICATION PACKETS" and an application entitled "ENHANCEMENTS TO PIM FAST RE-ROUTE WITH UPSTREAM ACTIVATION PACKETS", both of which were filed on Jun. 1, 2012.

FIELD

Embodiments of the invention relate to the field of network operations; and more specifically, to routing operations in a multicast communication network.

BACKGROUND

Protocol Independent Multicast Sparse Mode (PIM-SM) (see, IETF RFC4601 of August 2006) is a well known and commonly adopted protocol for constructing and maintaining multicast trees in Internet Protocol (IP) multicast communication networks. In order to distribute multicast content to recipient nodes (hereinafter also referred to as "destinations") of the multicast communication network, PIM-SM uses a single multicast tree. A single multicast tree lacks redundancy for re-routing multicast traffic in case of a network failure.

PIM-SM is commonly used nowadays for constructing multicast paths for real-time traffic (e.g., for Internet Protocol TV (IPTV)). However, because PIM-SM strongly depends on unicast routing, in case of a network failure multicast recovery needs to wait until unicast routing has recovered. Thus, failure reaction for PIM-SM is relatively slow and is, therefore, a serious drawback for real-time applications. In order to overcome this drawback, IETF RFC5714 of January 2010 proposes an Internet Protocol (IP) fast re-route mechanism the uses a secondary path for an incoming multicast stream of a network node, thereby providing an immediate alternative path should the network node lose its connection with its primary upstream neighbor node. However, the proposed approach does not provide an efficient failure detection technique and does not handle all of the possible failure scenarios.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 1A and 1B illustrate examples of multicast communication networks.

FIGS. 2A and 2B illustrate examples of a multicast tree with redundant secondary paths provided by MoFRR.

SUMMARY

Figures 3A, 3B, 3C:
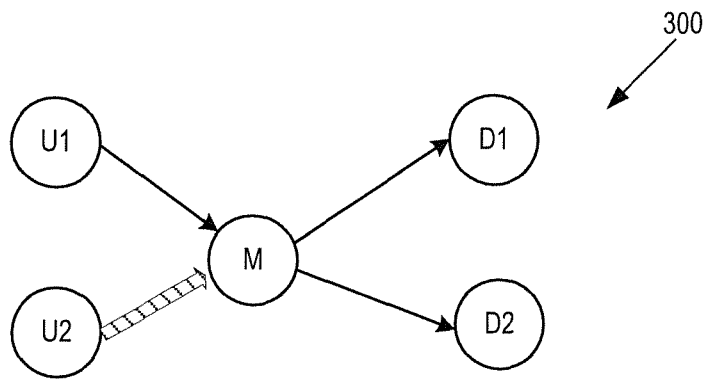
FIG. 3A illustrates a simplified network segment in a multicast communication network.
FIG. 3B illustrate an example of a forwarding table according to MoFRR.
FIG. 3C illustrate examples of a forwarding table according to enhanced MoFRR in one embodiment.

An enhanced fast re-route mechanism provides increased failure coverage to a multicast communication network. The multicast communication network includes a multicast tree to provide connectivity from a common source node to one or more multicast recipient nodes. The multicast communication network also includes a set of secondary paths to provide redundancy to the multicast tree.

In one embodiment, when a network node detects a loss of connection at an incoming interface leading to its upstream neighbor, it determines whether it can re-route multicast data traffic. If the network node determines that it cannot perform the re-routing, it sends a downstream fast notification packet (DFNP) downstream in the network. The DFNP causes a downstream merge node to switch reception of the multicast data traffic to its secondary path that leads to a common source node. The network node then receives an upstream fast notification packet (UFNP) from the merge node. The network node modifies its forwarding information upon receipt of the UFNP such that the multicast data traffic is to be received by the network node from a downstream neighbor of the network node via which the UFNP was received.

In another embodiment, a network node includes memory configured to store forwarding information for the multicast data traffic, and one or more processors configured to detect a loss of connection at an incoming interface to an upstream neighbor and to determine whether the network node can re-route the multicast data traffic such that the multicast data traffic can reach the multicast recipient nodes. The network node also includes a downstream module configured to originate a DFNP in response to a determination that the network node cannot re-route the multicast data traffic, and transmitter circuitry configured to send the DFNP downstream towards the multicast recipient nodes. The DFNP causes a downstream merge node to switch reception of the multicast data traffic to a secondary path that leads to the common source node. The network node also includes receiver circuitry configured to receive a UFNP from the downstream merge node and an upstream module configured to modify the forwarding information upon receipt of the UFNP such that the multicast data traffic is to be received by the network node from a downstream neighbor via which the UFNP was received.

In one embodiment, the UFNP and the DFNP cause the multicast data traffic to reverse a direction of flow between the network node and the downstream merge node to thereby re-route the multicast data traffic.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention increase the failure coverage of MoFRR by allowing multicast traffic to reverse its direction between a failure-detecting node and a merge node.

Before describing the embodiments of the invention, it is helpful to understand how a network node joins a multicast group according to PIM-SM. In PIM-SM, a network node uses unicast forwarding messages for joining or leaving a multicast group. In order to join a multicast group, the network node sends a JOIN message in upstream direction of the multicast tree to a common source node (the term "common source node" hereinafter refers to a multicast source node or a rendezvous point in the case of a shared tree). The JOIN message is routed along a path of the multicast tree determined by Multicast Routing Information Base (MRIB) tables. The paths listed in these tables are usually derived directly from unicast routing tables, but they could also be derived differently. Similarly, a network node wanting to leave a multicast group sends a PRUNE packet up the multicast tree to the common source network node.

The MRIB tables are used to determine next-hop neighbors to which the JOIN message is sent next. The JOIN message is routed and processed on a hop-by-hop basis until a network node already receiving the multicast content is reached. All network nodes along this hop-by-hop path process the JOIN message and install or update corresponding multicast routing state information; e.g., by adding the incoming interface via which the JOIN message was received to an outgoing interface list of the multicast. For example, if a node X receives a JOIN message via an incoming interface to node Y, node X will add node Y to the list of outgoing interfaces for the multicast. Multicast content are routed to network nodes in a direction reversed to the direction in which the JOIN messages were received.

Multicast only Fast Re-Route (MoFRR) is an IP fast re-route mechanism, where a network node joins a multicast group via more than one path. Joining a multicast group involves transmitting a JOIN message from the node towards a source on a primary path and another JOIN message from the node towards the source on a secondary path. Should a dual joining node loses its connection on the primary path, the node has an instantly available secondary path to which it can switch.

According to MoFRR, each dual-joining node has a primary upstream multicast hop (UMH) on the primary path and a secondary UMH on the secondary path. Each UMH is the node's previous-hop neighbor upstream from the node on the path toward a MultiCast Ingress node (MCI). An MCI is the node from which the multicast stream enters the current transport technology (e.g., PIM) domain, and, therefore, the MCI can be regarded as the multicast source for the current domain. In the description herein, the term "MCI" is used synonymously with a multicast source node. It is understood that embodiments of the invention are applicable to scenarios where an MCI is different from a multicast source node in a general sense; e.g., when the MCI receives multicast data from the multicast source node that is located in a different transport technology domain.

According to MoFRR, a dual-joining node's (J) secondary UMH can be chosen from a list of candidate nodes (i.e., previous-hop upstream nodes), which come from either node J's Equal Cost Multipath (ECMP) or Loop Free Alternate (LFA) neighbors on the paths towards the MCI. A node N is node J's ECMP neighbor if the node can be reached from node J with the same cost as the cost for node J to reach the primary UMH. A node N is node J's LFA neighbor if one of the LFA criteria specified in RFC 5289 (September 2008) or the non-ECMP mode conditions for MoFRR described in draft-karan-mofrr-02 (March 2012) is satisfied.

MoFRR implements a live-live multicast protection technique, where a dual joining node receives the same multicast stream from both the primary and secondary paths. To prevent duplicate packets being forwarding to the end user, a dual-joining node only accepts packets from one of the UMHs at a time in a network operating in the live-live protection mode. Which UMH is preferred is a local decision that can be based on Interior Gateway Protocol (IGP) reachability, link status, Bidirectional Forwarding Detection (BFD), traffic flow, etc. When no failure is detected in the network, receipt of duplicated packets can be prevented by blocking the incoming interface to the less-preferred UMH; i.e., packets received from this incoming interface are not forwarded on the multicast tree. If, however, the preferred UMH fails, the incoming interface to the less-preferred UMH can be unblocked to allow the traffic to continue downstream.

In the description herein, the term "upstream" refers to the direction along the paths toward the MCI, and the term "downstream" refers to the direction along the paths away from the MCI. Further, a "neighboring node" is a node one hop away from a current node. A "previous hop" is an upstream neighboring node of a current node, and a "next hop" is a downstream neighboring node of a current node. A "branch node" is a node coupled to more than one path going downstream; a "merge node" is a node coupled to more than one path coming from upstream.

Moreover, the terms "link," "interface" or "neighbor" can mean "physical" or "virtual" link, interface or neighbor. A "physical" link means a direction connection between two nodes. A physical interface or neighbor means an interface/node coupling to another interface/node via a physical link. A "virtual" link can be a lower-layer tunnel or a complex network between two nodes. A virtual interface/node means an interface/node coupling to another interface/node via a virtual link. For example, two IP routers connected via a complex Ethernet network are "virtual neighbors" at the IP level.

An enhanced MoFRR is described herein which provides fast re-route based on PIM-SM with increased failure coverage. The speed of failure reaction is improved by using a downstream fast notification packet (DFNP) that is generated and processed in the dataplane of a network node when the network node detects a failure. The use of DFNP improves the speed and reliability for reacting to non-local failures (i.e., remote failures, or equivalently, failures that have occurred at a node or link more than one hop away). The failure coverage is increased by providing failure coverage to the nodes that do not have a secondary UMH. The enhanced MoFRR will be described in detail below.

FIG. 1A illustrates a multicast communication network 12 that includes multiple network nodes ("nodes"). The multicast communication network 12 is an operator's network. A common source node (e.g., node S 11) sends multicast data to the members of its multicast group via a multicast tree topology. The common source node may be the MCI or a branch node of a multicast group. Multicast recipient nodes (e.g., node R 14), which are also referred to as MultiCast Egress node (MCE), are the nodes that are coupled to subscribers of the multicast, or domain egress nodes that are coupled to neighboring domains where there are subscribers of the multicast. The leaf nodes of the multicast tree are typically MCEs. Between the common source node and the leaf nodes of the multicast tree are a number of interior nodes (e.g., node N 13). Multicast data flows downstream from the common source node to the leaf nodes via the interior nodes. In one embodiment, one or more of the interior nodes may also be MCEs.

FIG. 1B is an example of a segment of a multicast communication network 100 that illustrates a problem of insufficient failure coverage provided by MoFRR. Assume that node S is a common source node and node M is a merge node in the network segment. From node S to Node M there are two alternative paths: one is a primary path S→F→N1→N2→M and the other is the secondary path S→F→N3→N4→M. Nodes N1 and N2 may have subscribers as well as node M. According to MoFRR, node M can switch multicast reception to the secondary path if node F fails. However, nodes N1 and N2 will be unable to receive the multicast in case of the failure, because they are not connected to a secondary path.

As explained above, a MoFRR network does not provide full failure coverage as some of the nodes in the network may not be connected to a secondary path. Embodiments of the invention increase the failure coverage of MoFRR by providing a redundant path using the nodes downstream from the failure on the primary path. In the example of FIG. 1B, a redundant path (indicated by the dotted lines) for nodes N1 and N2 can be provided by reversing the multicast data traffic between node N1 (which is the next hop from failure) and node M (which is the node having a working secondary path). Node M will receive multicast from the secondary path via nodes N3 and N4. As a result, all the nodes M, N1 and N2 can continue to receive multicast as before the failure of node F.

FIG. 2A illustrates an example of a multicast communication network 200 that supports MoFRR. The thin lines connecting MCI→A→B→C→D→E and MCI→F→G form a multicast tree defined by PIM-SM. The thick lines connecting A→J→C, C→K→E and G→H→I→D represent secondary backup paths added by MoFRR for nodes C, E and D, respectively. Thus, nodes C, D and E are dual-joining nodes. Node C's primary path from the MCI is MCI→A→B→C and its secondary path is MCI→A→J→C. Thus, node C's primary UMH is node B and secondary UMH is node J. Node B has node A as its primary UMH but does not have a secondary UMH.

FIG. 2B illustrates an example of a multicast communication network 210, which has the same configuration as network 200 but with a failed node A. According to the rules of MoFRR, each of nodes B, C, J and K does not have a working secondary path that can protect against the failure of node A. An embodiment of the enhanced MoFRR re-establishes the multicast stream in a fast pre-calculated manner to nodes not having a working secondary path. In the above example with the failure of A, node D can switch to a secondary UMH (i.e., node I). Node C can switch to node D, and nodes B and J can switch to node C. Node K will receive a DFNP from node C, and will forward it to node E (as node K has no secondary path). Node E, however, will only receive a DFNP from node K, because node D (which has a working secondary UMH) does not forward a DFNP to node E. Therefore, node E will receive a DFNP only from its secondary UMH, and will not react to it. As a result, the multicast data traffic flow is reversed between node B and node D, and between node J and node D, where nodes B and J are the next hops from failure, and node D is the node having a working secondary path.

Before describing the enhanced MoFRR that reverses the traffic flow in case of failure as in the example of FIG. 2B, a failure detection technique is explained first. The failure detection uses a downstream fast notification packet (DFNP) to notify the nodes downstream from a failure of the occurrence of the failure and that upstream nodes cannot repair the failure.

In one embodiment, when a node detects a local failure (which may be caused by a failure of its UMH or a link connecting to the UMH), the node originates a DFNP to all the downstream branches connecting to downstream nodes in the multicast group. In one embodiment, the downstream branches include all of the links on the primary paths and the secondary paths in the multicast group. The DFNP originating node is a failure-detecting node that has no failure-free secondary path to which it can fall back. If the failure-detecting node has an available secondary path available, it can use the secondary path to receive multicast data and no DFNP is generated. When a DFNP is generated, the downstream node that has an available secondary path can be triggered by the DFNP to make a switch-over to the secondary path.

The DFNPs can be generated in the dataplane, using only the forwarding information available in the dataplane without inputs from the control plane. The DFNPs can also be processed in the dataplane when they are received. All of the information necessary for sending and receiving a DFNP is available in the dataplane prior to the occurrence of a network failure. The dataplane-only approach significantly reduces the reaction time when a failure occurs. In one embodiment, the origination and processing of DFNPs can be performed within one or more line cards in the dataplane; updates to the control plane (e.g., the routing tables) can be performed moments later without impacting the failure recovery in real time.

If a failure occurs in a non-local upstream location, a dual-joining node needs a fast and reliable mechanism to detect the upstream failure. For embodiments based on MoFRR, a dual-joining node also needs to learn that other upstream nodes cannot circumvent the failure. Other methods based on traffic monitoring are limited in scope and work best with a steady state packet flow. For example, if there is constant heavy multicast traffic in the network, an interruption in the traffic flow can serve as an indicator of failure. By contrast, DFNPs are independently of the state of packet flows. A DFNP is an indicator of a non-local failure and can trigger the unblocking of a secondary backup path.

In the following, a description is provided regarding the rules (R1-R4) followed by each node downstream from the DFNP-originating node. In one embodiment, the rules may be stored in the dataplane circuitry of each node, such as the network node to be described below in FIGS. 7A and 7B.

(R1) If a node receives a DFNP from its primary UMH and has a failure-free secondary path (e.g., receiving no DFNP from its secondary UMH or detecting no failure at the connection to the secondary UMH), the node is a repair node. Upon receiving a DFNP, this repair node is to unblock the secondary path to its secondary UMH. The repair node does not forward the DFNP further downstream.

(R2) If a node receives a DFNP from its primary UMH but does not have a secondary UMH, the node is not a repair node. Upon receiving a DFNP, this node is to forward the DFNP to all of its downstream nodes. For embodiments based on MoFRR, the downstream nodes include all the nodes that are on the branches of the primary and secondary paths further downstream.

(R3) If a node receives two DFNPs—one from its primary UMH and the other from its secondary UMH, this node is also not a repair node. Receiving two DFNPs from respective UMHs is an indication that both of its primary path and secondary path are faulty. Upon receiving the two DFNPs, the node is to forward one of the DFNPs to all of the downstream nodes (as in R2). The other DFNP can be discarded (equivalent to "not forwarded"). In a scenario, the node upon receiving the DFNP from its primary path can wait for a predetermined amount of time to see if it will receive another DFNP from its secondary path. If another DFNP is received from the secondary path, the node does not need to unblock the secondary path because the unblocking cannot remedy the failure. In another scenario, the node upon receiving the DFNP from its primary path can unblock its secondary path immediately and discard the received DFNP. If the node subsequently receives no multicast data traffic but instead receives another DFNP from the secondary UMH, the node will forward this other DFNP to all of its downstream nodes.

(R4) A DFNP received only from the secondary UMH of a node is to be discarded.

The decision on whether to forward a DFNP can be summarized as follows. A node does not forward a DFNP further downstream if it receives the DFNP from its secondary path only, or if it receives the DFNP from its primary path and its secondary path is potentially working (e.g., the "down status" of the secondary UMH is not yet confirmed by local detection or by a DFNP received from the secondary UMH). A node forwards a DFNP further downstream if the node receives the DFNP from its primary path and no secondary path exists for the node, or if the node receives the DFNP from one of its primary path and secondary path and previously another DFNP was received from the other of its primary path and secondary path.

The example of FIG. 2A can be used to illustrate an application of the above rules. If node A fails, nodes B and J will both detect the failure locally (e.g., at their respective incoming interfaces) and each originates a DFNP. Both DFNPs are sent downstream towards node C. Node C is not a repair node because it will receive two DFNPs from its primary UMH (node B) and its secondary UMH (node J). Because node C is not a repair node it will forward one of the DFNPs towards K and D (observing rule R3). Node K does not have a secondary UMH for the multicast tree, so it will send the DFNP downstream towards node E (observing rule R2). Node D has a working secondary UMH (node I), so node D is the repair node (applying rule R1). Node E applies rule R4. As a result, subscribers sitting at or downstream from nodes D and E will continue receiving the multicast traffic.

A DFNP allows a node downstream from a failure to unambiguously identify the multicast tree impacted by the failure. In one embodiment, a DFNP includes a multicast source address and a multicast group address (e.g., in the IP source/destination address fields) identifying the multicast group or multicast tree.

A DFNP is easy to recognize by recipient nodes. In one embodiment, either a special IP protocol value (e.g., in the IP header) or a specially allocated User Datagram Protocol (UDP) port number can be used for distinguishing DFNPs from regular data packets in the multicast stream. If a special UDP port number is used, the IP protocol field may be set to an easily recognizable value, such as "103" corresponding to PIM. In some embodiments for troubleshooting purposes, the payload may contain the ID of the node originating the DFNP, and may also contain the ID of the node to which connectivity was lost and/or the link ID on which the connectivity was lost. In some embodiments, a DFNP may also include a timestamp indicating the time of its origination.

To enable the reversion of multicast flow as described in FIGS. 1B and 2B, each of the network nodes is configured to perform operations in three phases: a preparation phase, a first failure reaction phase and a second failure reaction phase. In the preparation phase, each network node prepares its incoming interfaces (IIFs) and outgoing interfaces (OIFs) such that it can have a fast reaction to failures. In one embodiment, the IIFs and OIFs are installed in the Forwarding Information Database (FIB) or forwarding tables in the dataplane cards (i.e., line cards) of a network node.

In the first failure reaction phase, a DFNP is sent downstream from the node detecting the failure of its UMH. When a node receives the DFNP, it unblocks its OIFs in the upstream direction. In the second failure reaction phase, the node which has a working secondary UMH (i.e., the repair node as defined by rules R1-R4 above) sends an upstream fast notification packet (UFNP) on its primary path towards the MCI along all of the branches upstream. When a node receives the UFNP, it unblocks its incoming interfaces to the downstream nodes.

The operations of the three phases are explained in further detail below. FIGS. 3A-3C illustrate an example of the preparation phase performed by a node M in a network segment 300 of FIG. 3A. Node M has a primary UMH U1 and a secondary UMH U2. Node M also has two downstream nodes D1 and D2. According to MoFRR as shown in FIG. 3B, node M stores a forwarding table 302 that contains a list of original IIFs 321: U1 and (U2), and a list of original OIFs 322: D1 and D2, where a pair of parentheses around an interface indicates that interface is blocked. According to an embodiment of the enhanced MoFRR with increase failure coverage as shown in FIG. 3C, node M stores a forwarding table 306 that contains a list of expanded IIFs 361: U1, (U2), (D1) and (D2), and a list of expanded OIFs 362: (U1), (U2), D1 and D2.

Referring to Node C of FIG. 2A, node C installs an IIF leading to node B and two OIFs leading to nodes D and K according to PIM (shown in Table 2). According to MoFRR, node C also installs an additional IIF leading to node J in blocked state, as node J is a secondary UMH towards MCI for node C. Node C receives the same traffic from nodes B and J, but traffic from node J is discarded.

According to one embodiment of the enhanced MoFRR, node C installs its interface towards B as a blocked OIF as well as an IIF. Node C also installs its interfaces to nodes D and K as blocked IIFs as well as OIFs. Tables 1-3 provide an example showing how the interfaces can be installed for a multicast tree from the MCI. Interfaces in parentheses are blocked.

TABLE 1

Interfaces of Node B before failure

| Node B | PIM | MoFRR | Enhanced MoFRR |
|---|---|---|---|
| Incoming interfaces | A | — | A, (C) |
| Outgoing interfaces | C | — | (A), C |

TABLE 2

Interfaces of Node C before failure

| Node C | PIM | MoFRR | Enhanced MoFRR |
|---|---|---|---|
| Incoming interfaces | B | (J) | B, (J), (D), (K) |
| Outgoing interfaces | D, K | — | (B), (J), D, K |

TABLE 3

Interfaces of Node D before failure

| Node D | PIM | MoFRR | Enhanced MoFRR |
|---|---|---|---|
| Incoming interfaces | C | (I) | C, (I), (E) |
| Outgoing interfaces | E | — | (C), (I), E |

Figure 4:
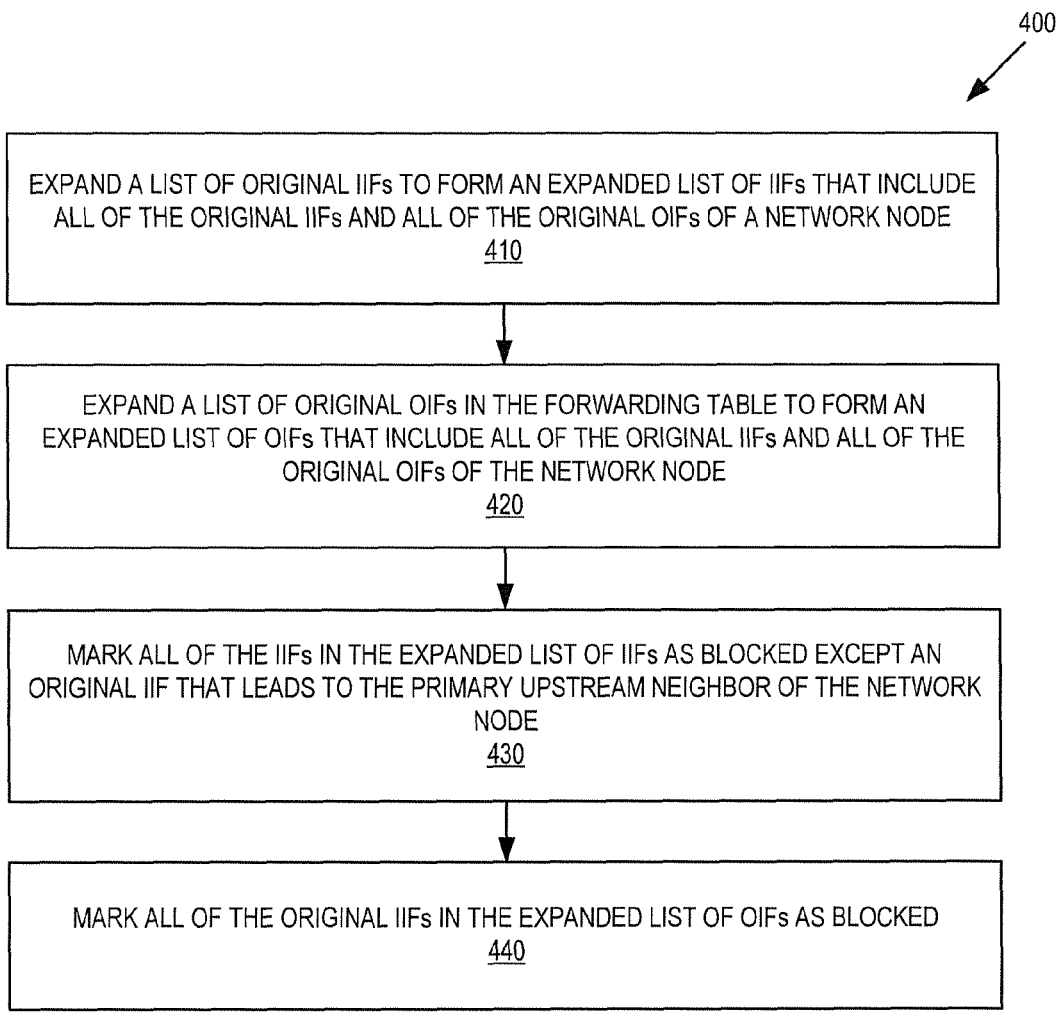
FIG. 4 is a flow diagram illustrating a method for setting up the interfaces during a preparation phase according to one embodiment.

FIG. 4 is a flow diagram illustrating a method 400 for installing the interfaces in each node of a multicast communication network. The method 400 begins with each network node expanding a list of original IIFs to form an expanded list of IIFs that include all of the original IIFs and all of the original OIFs of a network node (block 410). The "original IIFs" and "original OIFs" represent the interfaces that are installed according to MoFRR. Each network node then expands a list of original OIFs in the forwarding table to form an expanded list of OIFs that include all of the original IIFs and all of the original OIFs of the network node (block 420). Subsequently, each network node marks all of the IIFs in the expanded list of IIFs as blocked, except an original IIF that leads to its primary UMH (block 430). Each network node also marks all of the original IIFs in the expanded list of OIFs as blocked (block 440).

As all of the extra interfaces of the enhanced MoFRR are installed in blocked state, multicast data traffic flows identically to the multicast tree established with PIM when there is no failure in the network. When a failure occurs in the network, the operations of the network enter the first failure reaction phase, during which backup paths are activated in the multicast tree.

When a node detects a failure to its UMH, it originates a DFNP as described above if it does not have a working secondary path to fall back to. A downstream node receiving the DFNP processes the DFNP according to rules R1-R4 described above with the additional operations as follows.

When a downstream node receives a DFNP from an UMH, it is an indication that none of its upstream nodes can repair the failure. Thus, the downstream node finds the UMH interface in its expanded OIF list and unblocks that interface.

If this downstream node has a failure-free secondary path (i.e., it does not receive a DFNP from the secondary UMH or otherwise detects no failure from the secondary UMH), the downstream node unblocks its secondary UMH and blocks its primary UMH in the expanded IIF list. Unblocking the secondary UMH allows the downstream node to receive the multicast data traffic. In one embodiment, this downstream node is a merge node.

When the DFNP reaches this merge node, the operations of the network enter the second failure reaction phase, during which the multicast tree is modified such that data traffic received from this working secondary UMH is sent to the direction from which the DFNP was received.

During the second failure reaction phase, the merge node sends an upstream fast notification packet (UFNP), which is a notification generated and processed in the dataplane. The UFNP is sent towards the MCI along all of the paths in the upstream direction, including the primary paths and the secondary paths. Similar to a DNFP, a UFNP unambiguously identifies the multicast tree impacted by the failure. In one embodiment, a UFNP includes a multicast source address and a multicast group address (e.g., in the IP source/destination address fields) identifying the multicast group or multicast tree. A UFNP is easily recognizable by including a special IP protocol value (e.g., in the IP header) or a specially allocated User Datagram Protocol (UDP) port number, such as "103" corresponding to PIM. In some embodiments for troubleshooting purposes, the payload may contain the ID of the node originating the UFNP, and may also contain the ID of the node to which connectivity was lost and/or the link ID on which the connectivity was lost. In some embodiments, a UFNP may also include a timestamp indicating the time of its origination.

Any node that receives the UFNP unblocks the interface from which the UFNP was received in its expanded IIF list, and blocks the same interface in the expanded OIF list. Note that the UFNP may be received from multiple downstream legs but only the interface for the first UFNP received for that multicast group is unblocked in the expanded IIF list. Other UFNPs are discarded. A UFNP is sent upstream up to the point where the DFNP was originated.

Referring to the example FIG. 2B when a failure occurs to node A, a first DFNP is originated by node B and sent downstream to node C; a second DFNP is originated by node J and sent downstream to node C.

When node C receives the DFNPs, it unblocks the interface leading to node B in the expanded OIF list and sends one of the DFNPs further downwards to nodes D and K. The other DFNP is not forwarded. When node D receives the DFNP, it unblocks the interface leading to node C in its expanded OIF list. Node D has a working secondary UMH, so it unblocks its incoming interface to the secondary UMH, generates a UFNP and sends the UFNP upstream to node C.

When node C receives the UFNP, it unblocks the interface leading to node D in the expanded IIF list, blocks the same interface in its expanded OIF list, and forwards the UFNP upstream to node B. When node B receives the UFNP, it unblocks the interface leading to node C in its expanded IIF list, blocks the same interface in its expanded OIF list, and discards the UFNP as node B originated the DFNP.

The resulting modified multicast forwarding entries for nodes B, C and D are shown below in Tables 4-6. Interfaces in parentheses are blocked.

TABLE 4

Node B before and after failure according to enhanced MoFRR

| Node B | Before failure | After failure |
|---|---|---|
| Incoming interfaces | A, (C) | (A), C |
| Outgoing interfaces | (A), C | (A), (C) |

TABLE 5

Node C before and after failure according to enhanced MoFRR

| Node C | Before failure | After failure |
|---|---|---|
| Incoming interfaces | B, (J), (D), (K) | (B), (J), D, (K) |
| Outgoing interfaces | (B), (J), D, K | B, J, (D), K |

TABLE 6

Node D before and after failure according to enhanced MoFRR

| Node D | Before failure | After failure |
|---|---|---|
| Incoming interfaces | C, (I), (E) | (C), I, (E) |
| Outgoing interfaces | (C), (I), E | C, (I), (E) |

As can be seen from the above example, with enhanced MoFRR nodes B, C, J and K can receive the multicast data stream, which is not possible with conventional MoFRR. If nodes B, C, J and K have further nodes downstream below them (not shown in FIG. 2B), these downstream nodes can also continue receiving the multicast data traffic according to embodiments of the invention.

Figure 5:
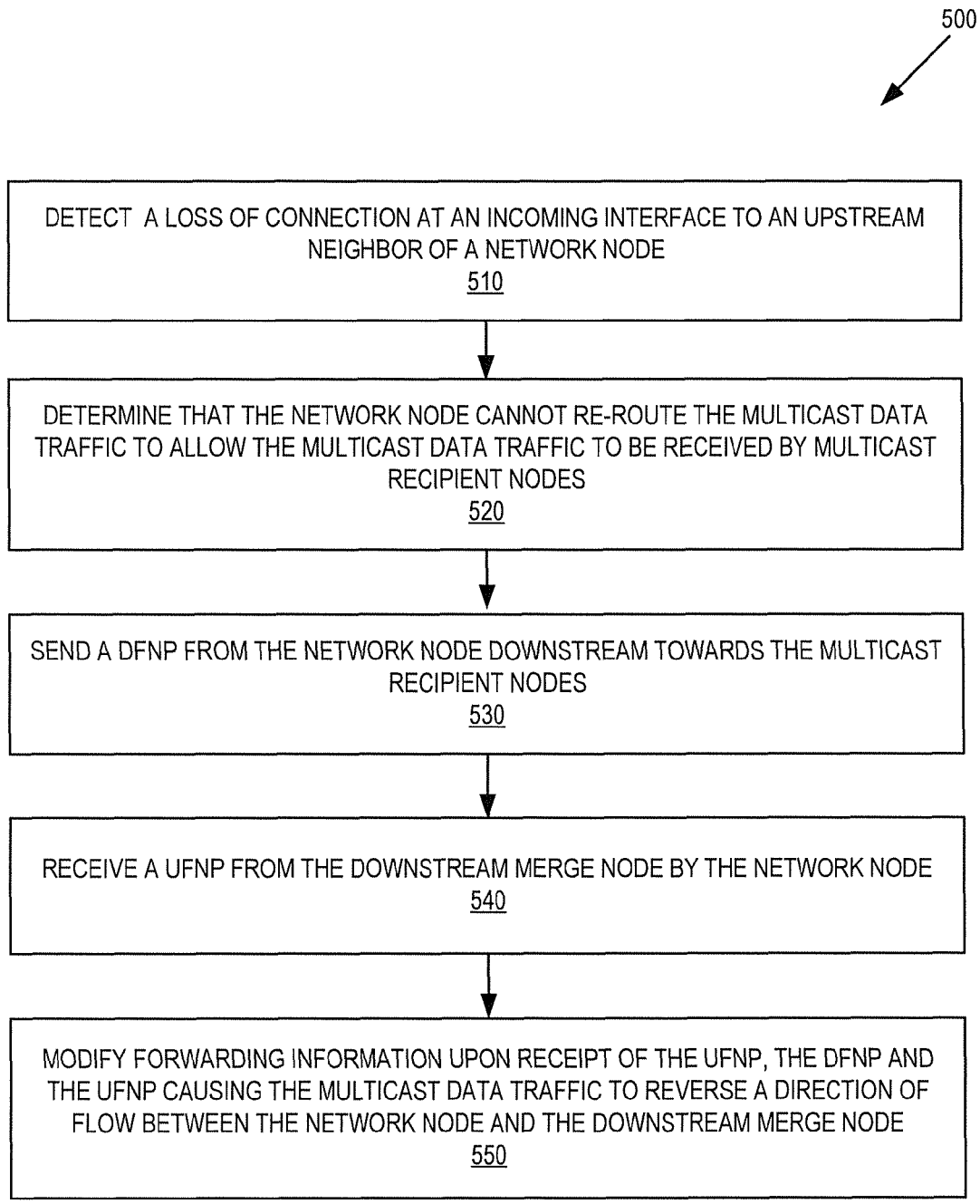
FIG. 5 is a flow diagram illustrating a method for operating a failure-detecting node according to one embodiment.

FIG. 5 is a flow diagram illustrating a method 500 for operating a network node in a multicast communication network according to one embodiment of the invention. The network node in this embodiment is the failure-detecting node. The method 500 begins with a network node detecting a loss of connection at its incoming interface to a UMH (block 510). The network node determines whether it can re-route the multicast data traffic to allow the multicast data traffic to be received by the multicast recipient nodes. If it is determined that the network node cannot perform the re-routing (block 520), the network node sends a DFNP downstream towards multicast recipient nodes (block 530). The DFNP causes a downstream merge node to switch reception of the multicast data packet to its secondary path leading to the common source node, and to forward the multicast data traffic to its upstream neighbor via which the DFNP was received. Subsequently, the network node receives a UFNP from the merge node (block 540). Upon receiving the UFNP, the network node modifies its forwarding information (block 550), such that the multicast data traffic can be received by the network node from its downstream neighbor via which the UFNP was received. The DFNP and the UFNP cause the multicast data traffic to reverse the direction of flow between the network node and the downstream merge node to thereby re-route the multicast data traffic.

Figure 6:
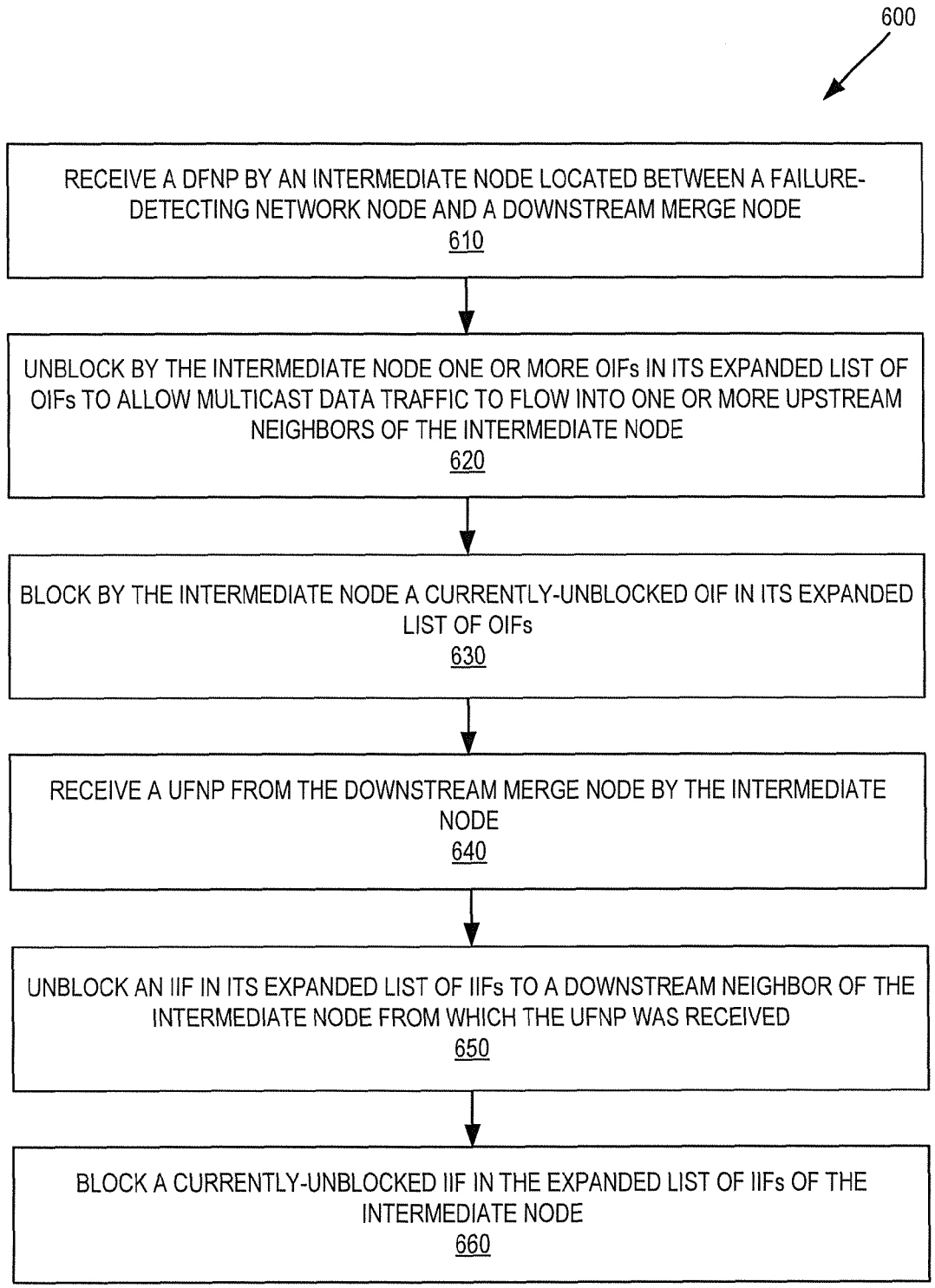
FIG. 6 is a flow diagram illustrating a method for operating an intermediate node between a failure-detecting node and a merge node according to one embodiment.

FIG. 6 is a flow diagram illustrating a method 600 for operating a network node in a multicast communication network according to one embodiment of the invention. The network node in this embodiment is an intermediate node between the failure-detecting node and the merge node. The method 600 begins with an intermediate node receiving a DFNP (block 610). The intermediate node unblocks one or more OIFs in its expanded OIF list to allow the multicast data traffic to flow into one or more upstream neighbors of the intermediate node (block 620). The intermediate node also blocks a currently-unblocked OIF in its expanded OIF list (block 630). When the intermediate node receives a UFNP (block 640), it unblocks an IIF in its expanded IIF list that leads to a downstream neighbor from which the UFNP was received (block 650). The intermediate node also blocks a currently-unblocked IIF in its expanded IIF list (block 660).

Figure 7A:
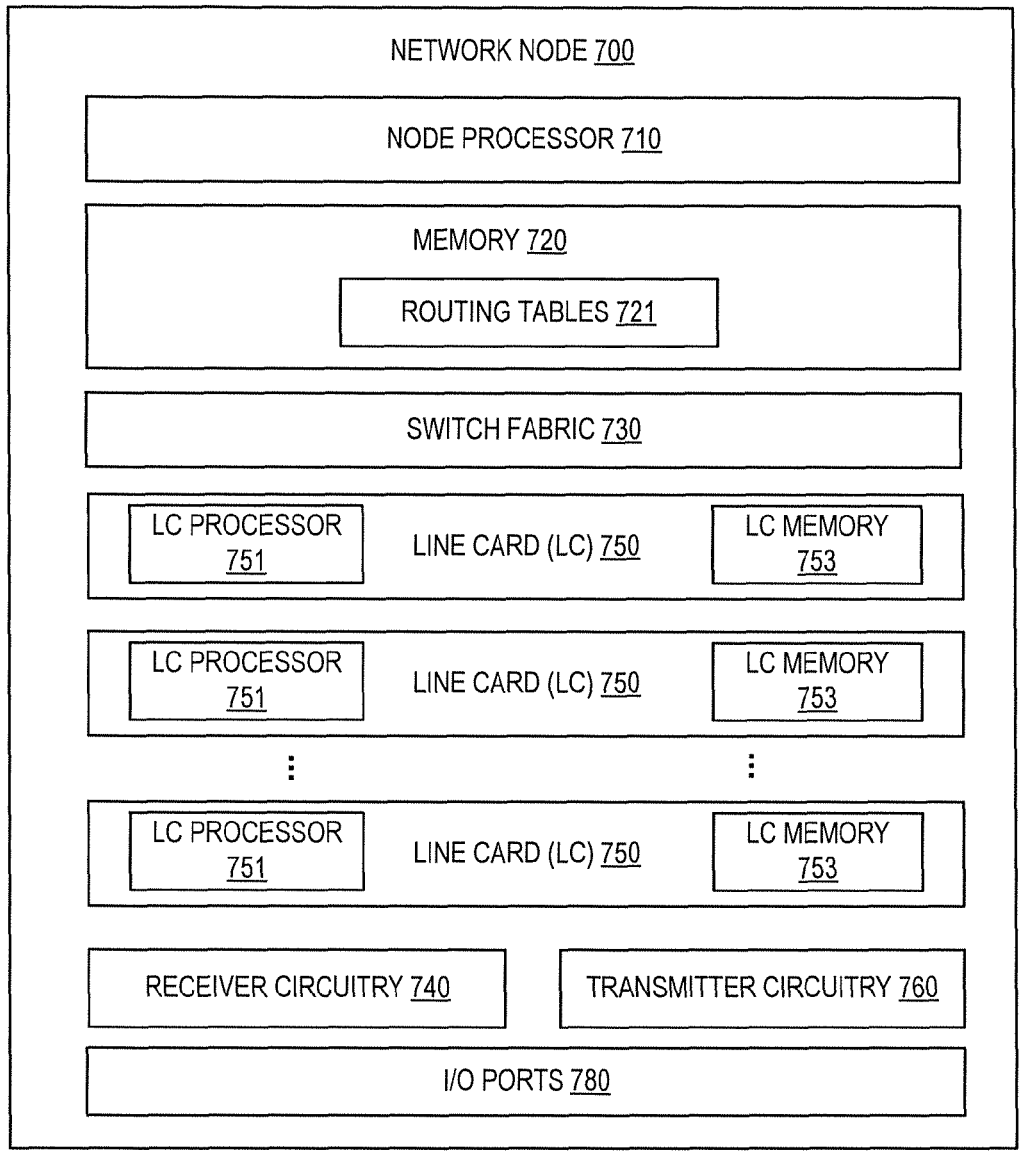
FIGS. 7A and 7B are diagrams of a network node according to one embodiment of the invention.
Figure 7B:
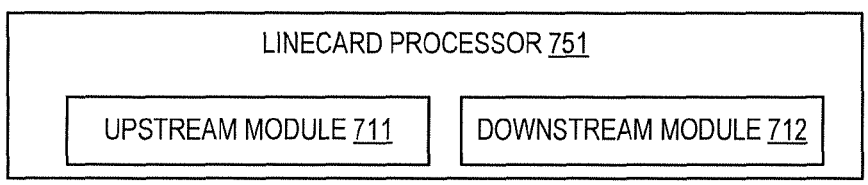

FIG. 7A illustrates an example of a network node 700 that may be used to implement an embodiment of the invention. As shown in FIG. 7A, the network node 700 includes a dataplane, which further includes a switching fabric 730, a number of line cards 750 and multiple I/O ports 780. Each line card 750 includes a line card processor 751 to perform functions on the data received over the I/O ports 780. As shown in FIG. 7B, an embodiment of the line card processor 751 includes an upstream module 711 and a downstream module 712. The upstream module 711 is configured to modify the forwarding information upon receipt of a UFNP such that the multicast data traffic can be received by the network node from a downstream neighbor via which the UFNP was received. The downstream module 712 is configured to originate a DFNP in response to a determination that the network node cannot re-route the multicast data traffic. The dataplane also includes line card memory 753 that stores forwarding tables for each multicast group to which the network node 700 is a member. The forwarding tables store forwarding information for tracking the network node's upstream neighbors (e.g., the UMHs), downstream neighbors, the IIFs and the OIFs to these neighbors. The switching fabric 730 switches data between the line cards 750.

The dataplane also includes receiver circuitry 740 and transmitter circuitry 760. The receiver circuitry 740 and the transmitter circuitry 760 are configured to receive and send, respectively, multicast data and control packets including the UFNPs and DFNPs described above.

The network node 700 also includes a control plane. The control plane further includes one or more node processors 710 containing control logic configured to handle the routing and management of the network traffic. The control plane also includes a memory 720, which stores one or more routing tables 721, among other things, to maintain the routing information of the network. It is understood that the network node 700 may include additional components and information than what is described above.

The operations of the diagrams of FIGS. 4-6 have been described with reference to the exemplary embodiment of FIGS. 7A and 7B. However, it should be understood that the operations of the diagrams of FIGS. 4-6 can be performed by embodiments of the invention other than those discussed with reference to 7A and 7B, and the embodiment discussed with reference to 7A and 7B can perform operations different than those discussed with reference to the diagrams of FIGS. 4-6. While the diagrams of FIGS. 4-6 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or on content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a network node in a multicast communication network, the multicast communication network including a multicast tree to provide connectivity from a common source node to one or more multicast recipient nodes, the multicast communication network further including a set of secondary paths to provide redundancy to the multicast tree, the method comprising the steps of:
   determining, in response to a loss of connection at an incoming interface to an upstream neighbor, that the network node cannot re-route the multicast data traffic to allow the multicast data traffic to reach the multicast recipient nodes;
   originating a downstream fast notification packet (DFNP) from the network node downstream towards the one or more multicast recipient nodes, wherein the DFNP causes a downstream merge node to switch reception of the multicast data traffic to a secondary path that leads to the common source node;
   receiving an upstream fast notification packet (UFNP) from the downstream merge node by the network node; and
   modifying forwarding information of the network node upon receipt of the UFNP such that the multicast data traffic is to be received by the network node from a downstream neighbor of the network node via which the UFNP was received, wherein the DFNP and the UFNP cause the multicast data traffic to reverse a direction of flow between the network node and the downstream merge node to thereby re-route the multicast data traffic.

2. The method of claim 1, wherein the downstream merge node is coupled to a primary upstream multicast hop (UMH) on a primary path to the common source node and a secondary UMH on the secondary path to the common source node, the method further comprising the step of:
   selecting the secondary UMH based on Equal Cost Multi-Path (ECMP) or Loop Free Alternate (LFA).

3. The method of claim 1, wherein network node includes a forwarding table in memory that records a list of original outgoing interfaces (OIFs) and a list original incoming interfaces (IIFs) of the network node, and wherein, prior to the step of detecting, the method further comprises the steps of:
   expanding the list of original IIFs in the forwarding table to form an expanded list of IIFs that include all of the original IIFs and all of the original OIFs;
   expanding the list of original OIFs in the forwarding table to form an expanded list of OIFs that include all of the original IIFs and all of the original OIFs;
   marking all of the IIFs in the expanded list of IIFs as blocked except an original IIF that leads to the primary upstream neighbor of the network node; and
   marking all of the original IIFs in the expanded list of OIFs as blocked.

4. The method of claim 1, wherein a set of intermediate nodes are located between the network node and the downstream merge node, and wherein the DFNP causes each intermediate node to unblock one or more OIFs that lead to one or more upstream neighbors of the intermediate node, and to block a currently-unblocked OIF.

5. The method of claim 1, wherein the DFNP causes the downstream merge node to unblock an OIF leading to a primary upstream neighbor of the downstream merge node, to unblock an IIF leading to a secondary upstream neighbor of the downstream merge node, and to block a currently-unblocked IIF.

6. The method of claim 1, wherein a set of intermediate nodes are located between the network node and the downstream merge node, wherein the UFNP causes each intermediate node to unblock an IIF to a downstream neighbor of the intermediate node from which the UFNP was received, and to block a currently-unblocked IIF.

7. The method of claim 1, wherein the step of determining further comprises determining one or more of the following:
   determining that the network node does not have a secondary path coupling the common source node to the network node, determining that the network node receives an indication of failure from the secondary path, or determining that the network node detects failure at an IIF coupled to a secondary upstream neighbor on the secondary path.

8. The method of claim 1, wherein processing of the DFNP and the UFNP is based on the forwarding information stored on one or more line cards of the network node in a dataplane.

9. The method of claim 1, wherein the DFNP is not forwarded further downstream when the DFNP reaches the downstream merge node.

10. The method of claim 1, wherein the UFNP is not forwarded further upstream when the UFNP reaches the network node.

11. A network node in a multicast communication network that includes a multicast tree to provide connectivity from a common source node to one or more multicast recipient nodes, the multicast communication network further including a set of secondary paths to provide redundancy to the multicast tree, the network node comprising:
   memory configured to store forwarding information for the multicast data traffic;
   one or more processors coupled to the memory, the one or more processors configured to determine whether the network node can re-route the multicast data traffic to allow the multicast data traffic to reach the multicast recipient nodes, in response to a detected loss of connection at an incoming interface to an upstream neighbor;
   a downstream module coupled to the processor, the downstream module configured to originate a downstream fast notification packet (DFNP) in response to a determination that the network node cannot re-route the multicast data traffic, wherein the DFNP causes a downstream merge node to switch reception of the multicast data traffic to a secondary path that leads to the common source node; and an upstream module coupled to the processor, the upstream module configured to modify the forwarding information upon receipt of the UFNP such that the multicast data traffic is to be received by the network node from a downstream neighbor of the network node via which the UFNP was received, and wherein the UFNP and the DFNP cause the multicast data traffic to reverse a direction of flow between the network node and the downstream merge node to thereby re-route the multicast data traffic.

12. The network node of claim 11, wherein the downstream merge node is coupled to a primary upstream multicast hop (UMH) on a primary path to the common source node and a secondary UMH on the secondary path to the common source node, and wherein the secondary UMH is selected based on Equal Cost MultiPath (ECMP) or Loop Free Alternate (LFA).

13. The network node of claim 11, wherein the memory includes a forwarding table that records a list of original outgoing interfaces (OIFs) and a list original incoming interfaces (IIFs) of the network node, and wherein prior to detection of the loss of connection, the one or more processors are configured to expand the list of original IIFs in the forwarding table to form an expanded list of IIFs that include all of the original IIFs and all of the original OIFs, expand the list of original OIFs in the forwarding table to form an expanded list of OIFs that include all of the original IIFs and all of the original OIFs, mark all of the IIFs in the expanded list of IIFs as blocked except an original IIF that leads to the primary upstream neighbor of the network node, and mark all of the original IIFs in the expanded list of OIFs as blocked.

14. The network node of claim 11, wherein a set of intermediate nodes are located between the network node and the downstream merge node, and wherein the DFNP causes each intermediate node to unblock one or more OIFs that lead to one or more upstream neighbors of the intermediate node, and to block a currently-unblocked OIF.

15. The network node of claim 11, wherein the DFNP causes the downstream merge node to unblock an OIF leading to a primary upstream neighbor of the downstream merge node, to unblock an IIF leading to a secondary upstream neighbor of the downstream merge node, and to block a currently-unblocked IIF.

16. The network node of claim 11, wherein a set of intermediate nodes are located between the network node and the downstream merge node, wherein the UFNP causes each intermediate node to unblock an IIF to a downstream neighbor of the intermediate node from which the UFNP was received, and to block a currently-unblocked IIF.

17. The network node of claim 11, wherein the one or more processors are configured to determine that the network node cannot re-route the multicast data traffic based on one or more of the following: the network node does not have a secondary path coupling the common source node to the network node, the network node receives an indication of failure from the secondary path, or the network node detects failure at an IIF coupled to a secondary upstream neighbor on the secondary path.

18. The network node of claim 11, wherein the network node is configured to process the DFNP and the UFNP based on the forwarding information stored on the one or more line cards.

19. The network node of claim 11, wherein the DFNP is not forwarded further downstream when the DFNP reaches the downstream merge node.

20. The network node of claim 11, wherein the UFNP is not forwarded further upstream when the UFNP reaches the network node.

* * * * *

UNITED STATES PATENT AND TRADEMARK OFFICE
CERTIFICATE OF CORRECTION

PATENT NO. : 9,197,547 B2
APPLICATION NO. : 14/333327
DATED : November 24, 2015
INVENTOR(S) : Császár It is certified that error appears in the above-identified patent and that said Letters Patent is hereby corrected as shown below:

On the Title Page, item 74, under "Attorney, Agent, or Firm", in Column 2, Line 2, delete "Elliot, LLP" and insert -- Elliott, LLP --, therefor.

On Page 2, item 56, under "OTHER PUBLICATIONS", in Column 2, Line 18, delete "Rescorla, E." and insert -- Rescorla, E., --, therefor.

On Page 2, item 56, under "OTHER PUBLICATIONS", in Column 2, Line 19, delete "MOe (CGM)"," and insert -- Mode (GCM)", --, therefor.

In the Specification

In Column 1, Line 8, delete "2012," and insert -- 2012, now Pat. No. 8,824,276, --, therefor.

In Column 3, Line 50, delete "dual joining" and insert -- dual-joining --, therefor.

In Column 4, Line 13, delete "dual joining" and insert -- dual-joining --, therefor.

In Column 9, Line 60, delete "DNFP," and insert -- DFNP, --, therefor.

Signed and Sealed this
Nineteenth Day of April, 2016

Michelle K. Lee
*Director of the United States Patent and Trademark Office*